United States Patent [19]

Farnsworth

[11] 4,046,182
[45] Sept. 6, 1977

[54] SAFETY TIRE AND WHEEL ASSEMBLIES

[75] Inventor: Frank Farnsworth, Sutton Coldfield, England

[73] Assignee: Dunlop Limited, London, England

[21] Appl. No.: 600,129

[22] Filed: July 29, 1975

[30] Foreign Application Priority Data

Aug. 8, 1974   United Kingdom ............... 34957/74

[51] Int. Cl.² ............................................. B60C 17/04
[52] U.S. Cl. ................................ 152/158; 152/330 RF
[58] Field of Search ........... 152/158, 399, 400, 330 L, 152/330 RF

[56] References Cited

U.S. PATENT DOCUMENTS

| | | | |
|---|---|---|---|
| 1,237,398 | 8/1917 | Sjobring | 152/158 |
| 1,771,963 | 7/1930 | Krone | 152/158 |
| 3,180,391 | 4/1965 | Lindley | 152/158 |
| 3,635,273 | 1/1972 | Patecell | 152/158 |

FOREIGN PATENT DOCUMENTS 443,677   3/1936   United Kingdom ................ 152/158

Primary Examiner—Drayton E. Hoffman
Attorney, Agent, or Firm—Stevens, Davis, Miller & Mosher

[57] ABSTRACT

A safety tire and wheel rim assembly incorporating a safety tire support member which is capable of slippage relative to the rim. The wheel rim is of substantially uniform diameter between its bead seats and a pair of spacer members are provided, one on each side of the safety support to give axial location and a bead restraint. Each spacer member has a low friction interface with the support member and a high friction interface with the tire bead.

14 Claims, 4 Drawing Figures

SAFETY TIRE AND WHEEL ASSEMBLIES

This invention relates to safety tire and wheel assemblies, more particularly to safety tire and wheel assemblies containing a safety insert intended to become load bearing upon deflation of the tire.

Many proposals have been made relating to load support members for use in tire and wheel assemblies in which an annular support has been provided to carry the load to the tread of the tire upon tire deflation. It has also been realized that there will be a difference in rolling radius between the two in contact and hence frictional heat will develop unless provision is made to allow relative movement.

One such proposal in which provision for the relative movement is made is described in U.S. Pat. No. 3,635,273. This specification describes a safety insert consisting of a ring made up of arcuate members and which will slip circumferentially upon the wheel rim when the tire is running deflated to prevent frictional heat generation between the tire and the insert.

When a safety insert of this type is to be used on a wheel rim of a divided or loose flanged type in which no well is required for fitting of the tire the problem arises of providing for axial location of the safety insert without interference with its ability to slip circumferentially.

According to the present invention a safety tire and wheel rim assembly comprises a pneumatic tire, a wheel rim having a pair of bead retaining flanges, bead seats and between the bead seats a substantially uniform diameter, a safety insert for carrying load between the wheel rim and the tire when the tire becomes deflated, the insert being capable of circumferential slippage relative to the wheel rim when the assembly is used with the tire in a deflated condition, and a pair of spacers extending circumferentially around the rim on either side of said insert, engaging the axially inner surfaces of the respective beads of the tire and the sides of said safety insert to provide axial location of said insert, the surface of each spacer engaging a bead having a high coefficient of friction with rubber and the surface of the spacer engaging the insert having a low coefficient of friction with the material of the insert with which it is in contact to permit circumferential slippage of the insert on the rim relative to the tire beads.

The invention allows a safety insert which will slip on the rim to be used on the rim which has no well which could be used to provide axial location of the insert. It also provides a means for maintaining the beads of the tire on the bead seats when the tire is deflated. This latter feature is necessary to attain an assembly which will permit vehicle control to be maintained when the tyre deflates i.e. which will transmit braking, acceleration and lateral forces between the wheel and the road. The present invention is particularly useful in truck applications, where the wheels commonly have divided or loose-flanged rims without a well, although not limited to this field.

The safety insert may suitably be a ring made up of a plurality of arcuate members each having coupling portions at each end, fastened together and made from a rigid material which will bear the necessary stresses and strains. Such a safety insert is described in U.K. Pat. No. 1,375,415. Preferably the internal diameter of the insert relative to the wheel rim diameter, and the material of the inner periphery of the insert are such that the insert grips the wheel rim sufficiently to rotate with the wheel under normal inflated running conditions while being able to slip relative to the rim during deflated running conditions.

The invention also provides an annular spacer for use in locating a circumferentially extending safety insert in a safety tire and wheel rim assembly, said spacer including two substantially radially extending surfaces one surface being of low friction material to permit movement of the safety insert relative to that surface the other surface being of a material having a high coefficient of friction with rubber to enable said other surface to engage and move with an interior surface of a tire bead.

The spacer may be a continuous ring having substantially uniform axial thickness around its whole circumference or it may comprise a band of rigid material e.g. metal, having a plurality of blocks mounted on it at intervals around its circumference.

If desired the spacer may comprise two or more separate component parts which may not be fastened together, particularly when the member is to be in the form of a continuous ring when the component parts themselves may be annular.

The surface of the spacer contacting the insert is preferably of a rigid material and will have a low coefficient of friction $\mu$ e.g. preferably not more than 0.3 $\mu$ with the surface of the safety insert with which it engages. Suitable materials for this face of the spacer are metals such as steel or resinous materials. A surface coating of a low friction such as P.T.F.E. may be used if desired.

The surface of the spacer which contacts the tire bead is preferably a vulcanized rubber material which will grip the bead.

In order to ease fitting together of the assembly and eliminate any need for close tolerances it is preferable that the spacers are capable of a degree of compression. For this reason the portions of the spacers which will be adjacent the tire beads are preferably made from a non-rigid material such as rubber, which may if required contain holes to increase the compressibility of the spacers and to allow passage of inflation air into the chamber of the tire. Preferably 75 per cent or more of the axial thickness of the spacers comprises a compressible elastic material.

When the spacers are to be continuous rings the compressibility may be obtained without the need to make a ring with radial holes by making the ring in two annular parts so that the spacer is effectively split into two in the plane of the ring. Radially extending holes in the spacer can then be provided by the simple expedient of suitably contouring the surface one or both of the parts of the spacer to leave radially extending spaces between the parts of the spacer when the parts are assembled together in use.

An embodiment of the invention will now be described, by way of example only, with reference to the accompanying drawing in which FIG. 1 is a diagrammatic cross-sectional view of a tire and wheel assembly containing a safety insert and pair of spacers;

The assembly shown consists of a truck tire 1 mounted on a divided wheel rim 2 and containing a safety insert 3 and a pair of spacer members 4 and 5.

Figure 3:
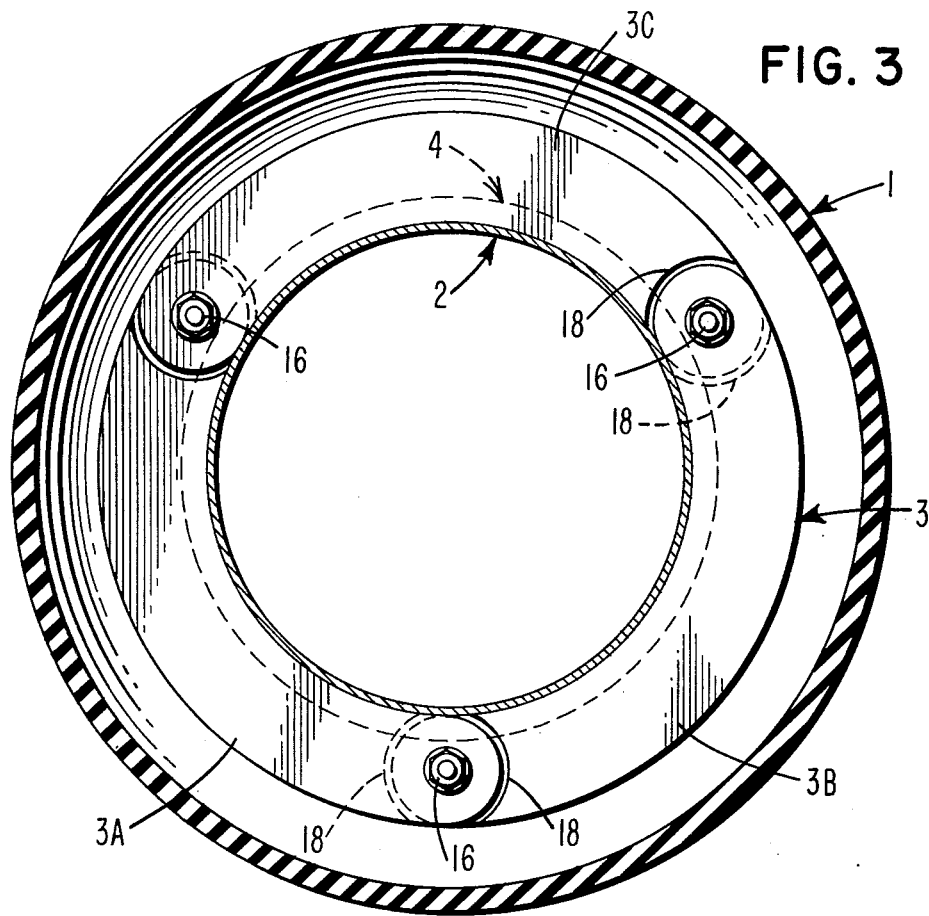
FIG. 3 is a sectional view of the invention of FIG. 1 along lines 3—3.

The safety insert 3 consists of three arcuate members 3A, 3B and 3C as shown in FIG. 3, each having coupling portions at each end and bolted together with a nut and bolt 16 to form a ring. The insert is made, for example, of high density polyethylene and has mortised ends 18 where the portions fit together.

The inner periphery 6 of the insert is cylindrical and the sides 7 of the insert are smooth.

The spacer members 4,5 consist of an annulus 8 of metal or synthetic polymeric resin bonded to an annulus of rubber 9 whose opposite surface 10 is contoured to match the tire bead profile. Holes 11 are provided at intervals in the rubber portion 9 of the spacer members to increase their compressibility.

The spacer members 4,5 are of sufficient thickness to bridge the gap between the tire 12,13 and the safety insert 3 to provide axial location of the safety insert and also to prevent the tire beads 12,13 moving axially inwardly from their bead seats 14,15.

In operation of the assembly in an inflated condition there is sufficient grip between the safety insert and the rim for the insert to rotate with the rim. On deflation of the tire the insert comes down onto the deflated tire and carries the load between the rim and the tire. In this condition slippage of the insert relative to the rim and the metal faces 8 of the spacer members is able to take place to accommodate the difference in rolling radius between the interior of the tire tread and the outer periphery of the safety insert and prevent frictional heat developing therebetween.

Fitting of the assembly is carried out by first inserting the spacer member 4 and the arcuate portions of the safety insert — at least one of which is totally disconnected — into the tire. The bead 12 of the tire is then slipped onto the wider portion of the divided rim followed by the spacer member 4 and the safety insert 3. The safety insert 3 is then fastened together around the rim.

The second spacer member 5 is placed around the rim against the safety insert 3 and then the narrower rim portion is brought up to the bead 13, forcing the bead into contact with the spacer member 5 and finally the rim portions are bolted or assembled together. Dismantling is simply the reverse of this procedure.

Figure 1:
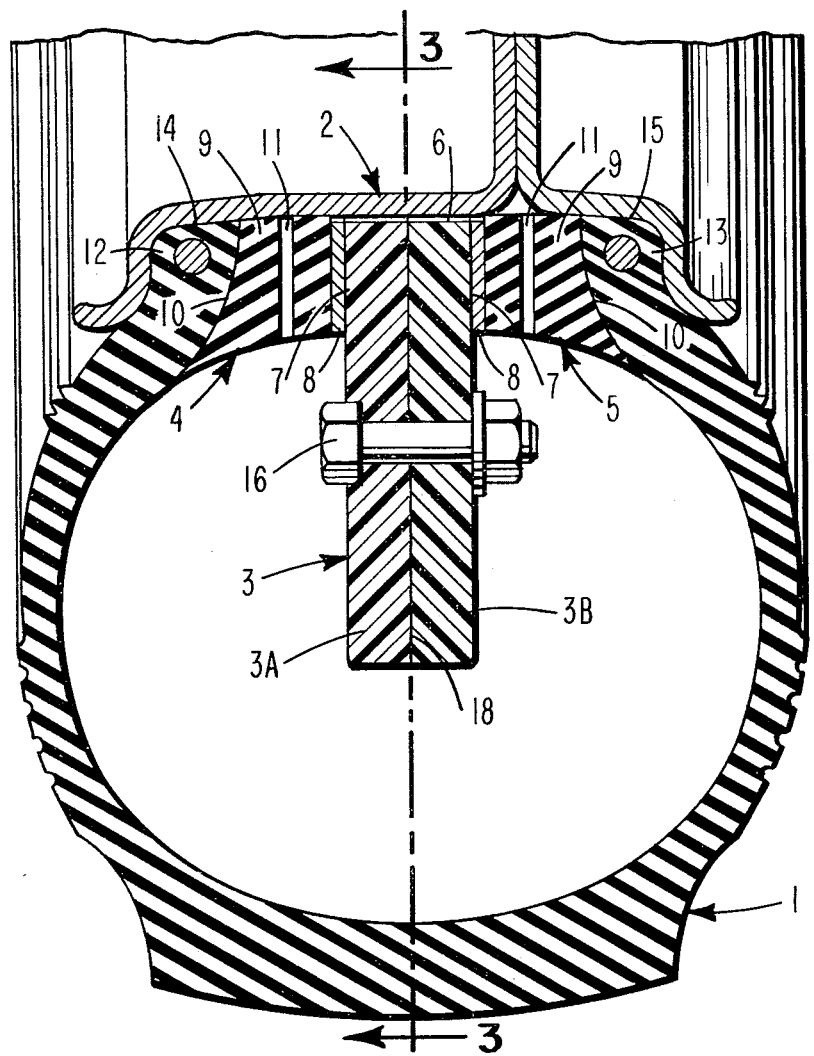
Figure 2:
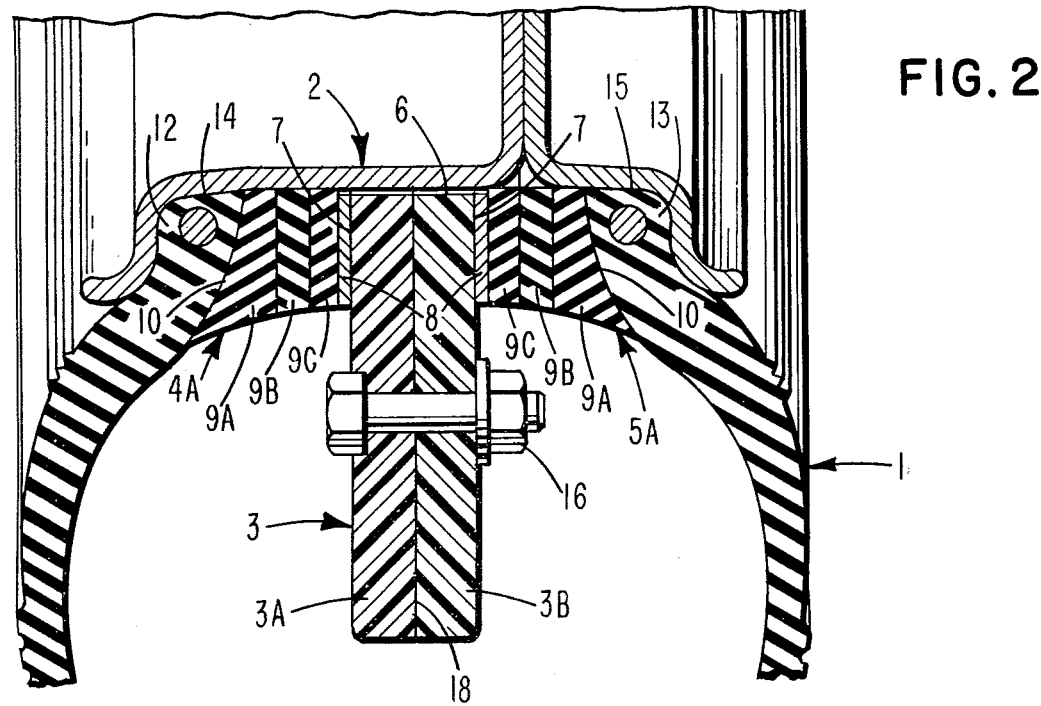
FIG. 2 is cross-sectional view of a tire and wheel assembly showing modified spacer elements 4A and 5A.

FIG. 2 shows a modified assembly in which the spacers each comprise two or more separate annular component parts which are not fastened together. The reference numerals are the same as in FIG. 1 with numerals 4A and 5A identifying the modified spacer elements and numerals 9A, 9B and 9C identifying the separate component parts.

Figure 4:
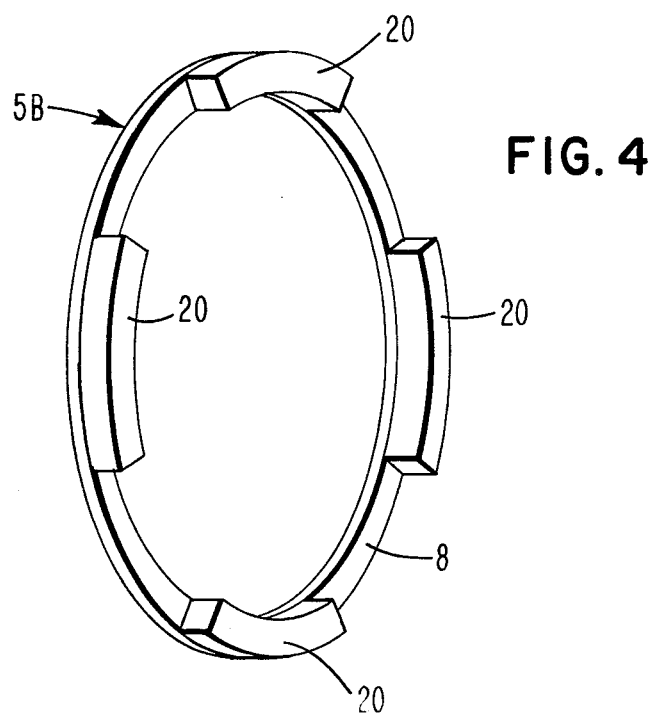
FIG. 4 is a perspective view of another modification of a spacer element.

FIG. 4 shows a spacer element 5B in which the spacer comprises a band 8 of rigid material having a plurality of blocks 20 mounted at intervals around its circumference.

Having now described my invention what I claim is:

1. A safety tire and wheel rim assembly comprising a pneumatic tire, a wheel rim having a pair of bead retaining flanged, bead seats, and between the bead seats a substantially uniform diameter, a safety insert for carrying load between the wheel rim and the tire when the tire becomes deflated, the insert being mounted for circumferential slippage relative to the wheel rim when the assembly is used with the tire in a deflated condition and having a pair of spacers extending circumferentially around the rim on either side of said insert, with one surface of each spacer engaging the axially inner surface of the respective beads of the tire and the other surface of each spacer engaging the sides of said safety insert to provide axial location of said insert, the surface of each spacer engaging a bead having a high coefficient of friction with rubber and the surface of the spacer engaging the insert having a low coefficient of friction with the material of the insert with which it is in contact, to permit circumferential slippage of the insert on the rim relative to the tire beads.

2. An assembly according to claim 1 in which each spacer is a continuous ring having substantially uniform axial thickness around its whole circumference.

3. An assembly according to claim 1 in which the spacers each comprise a band of rigid material having a plurality of blocks mounted thereon at intervals around its circumference.

4. An assembly according to claim 1 in which the spacers each comprise two or more separate annular component parts which are not fastened together.

5. An assembly according to claim 1 in which the surface of each spacer contacting the insert is of a rigid material having a coefficient of friction not more than 0.3 $\mu$ with the surface of the safety insert which it engages.

6. An assembly according to claim 1 in which the surface of the spacer contacting the insert is provided with a surface coating of a low friction material.

7. An assembly according to claim 1 in which the surface of the spacer which contacts the tire bead is a vulcanized rubber material.

8. An assembly according to claim 1 in which the safety insert comprises a plurality of arcuate members each having coupling portions at each end and coupled together to form a ring.

9. An annular spacer for use in locating a circumferentially extending safety insert in a safety tire and wheel rim assembly, said spacer including two substantially radially extending surfaces, one surface being of low friction material to permit movement of the safety insert relative to that surface, the other surface being of a material having a high coefficient of friction with rubber to enable said other surface to engage and move with an interior surface of a tire bead.

10. A spacer according to claim 9 comprising a continuous ring having substantially uniform axial thickness around its whole circumference.

11. A spacer according to claim 9 comprising a band of rigid material having a plurality of blocks mounted thereon at intervals around its circumference.

12. A spacer according to claim 9 in which the surface of the spacer, having said low friction material, comprises a surface coating of low friction material.

13. A spacer according to claim 9 in which the surface of the spacer which contacts the tire bead is a vulcanized rubber material.

14. A spacer according to claim 9 which comprises a compressible elastic material forming at least 75 percent of its axial thickness in the uncompressed condition.

* * * * *